2,843,616

TRIALKYL PHOSPHITES AND METHOD OF MAKING SAME

Edgar E. Hardy and Theodor Reetz, Anniston, Ala., assignors to Monsanto Chemical Company, St. Louis, Mo., a corporation of Delaware No Drawing. Application October 19, 1953
Serial No. 387,052

7 Claims. (Cl. 260—461)

This invention relates to a method of producing trialkyl phosphites containing a total of from 3 to 12 carbon atoms and other valuable esters of phosphorus acids. More particularly, it relates to a method of recovering these esters from mixtures containing same.

An object of the invention is to provide an economically and commercially practical method of producing and recovering trialkyl phosphites containing a total of from 3 to 12 carbon atoms and also other esters of phosphorus acids from mixtures containing same.

Another object of the invention is to provide an improved method of preparing the above trialkyl phosphites, which does not involve filtering an amine hydrohalide formed in the reaction and then liberating the amine by decomposing the salt in a separate operation.

A further object of the invention is to provide a novel catalytic method of producing trialkyl phosphites in which the yield of the desired product is substantially increased over that obtainable by the same reaction when the catalyst is omitted.

Other objects and advantages will appear hereinafter as the description of the invention proceeds.

It is known in the art that trialkyl phosphites may be prepared by reacting substantially 3 mols of an alcoholate with about 1 mol of a trihalide selected from the group consisting of phosphorus trichloride and phosphorus tribromide. This reaction is carried out in the presence of an inert organic solvent and results in very poor yields of the desired trialkyl phosphite since, due to side reactions, substantial amounts of trialkyl phosphates and/or trialkyl phosphonates are produced. Moreover, it is extremely difficult to effect a satisfactory separation of these impurities from the trialkyl phosphite by the methods of the prior art. (Arbuzov Berichte 38, page 1171, 1905.)

We have developed a method of producing and recovering trialkyl phosphites containing a total of from 3 to 12 carbon atoms, which eliminates the difficulties and disadvantages of the known method described above. Moreover, this new method results in the production of relatively pure trialkyl phosphites in a yield which greatly exceeds that obtainable by the known method. In accordance with the method of the instant invention, a phosphorus trihalide selected from the group consisting of $PCl_3$ and $PBr_3$ is reacted with an alcoholate in the presence of an inert solvent and catalytic amounts of a tertiary amine, the reactants being employed in the proportions required to form the corresponding triester. The resulting solution of trialkyl phosphite containing the tertiary amine, the metallic halide and a small amount of other by-product phosphorus esters is subjected to distillation to separate the trialkyl phosphite and the other phosphorus esters from the reaction mixture directly, these products being collected as separate fractions. After separation of the phosphorus esters, the residue is treated to remove the inert solvent and amine, which are recycled to the reaction for use in the production of further quantities of the trialkyl phosphite and small amounts of other phosphorus esters.

The method of the instant invention is an improvement over the one described earlier herein in that it results in substantially improved yields of the trialkyl phosphite with a corresponding reduction in the yield of the phosphorus ester by-products over the non-catalytic method, and in addition provides a relatively simple means of recovering these esters from the reaction mixture containing same.

The following examples illustrate the improved method of this invention.

EXAMPLE I

*Trimethyl phosphite*

About 69 grams (3 mols) of metallic sodium was added with vigorous stirring to 600 cc. of an inert solvent which was heated to a temperature of 100° C. The sodium dispersion thus obtained was cooled to about 80° C. and about 96 grams (3 mols) of methanol was added slowly to convert the sodium to sodium methylate. The reaction mixture was stirred for 1 hour after the addition and then cooled to about 15° C., whereupon about 18.5 grams (0.1 mol) of tributylamine was introduced. To the resulting product, a solution of about 137.4 grams (1 mol) of phosphorus trichloride in 100 cc. of the above solvent was added slowly with stirring and during the addition the reaction temperature was maintained below 20° C. After this operation had been completed, the reaction mixture was subjected to distillation under reduced pressure and three fractions were collected. One fraction comprised dimethyl phosphite which boiled at 32° C.–68° C. at 16–35mm. Hg; a second fraction comprised trimethyl phosphate or dimethyl methane phosphonate which boiled at 74° C.–88° C. at 16 mm. Hg; and a third fraction consisting almost entirely of trimethyl phosphite which boiled at 30° C.–37° C. at 35–60 mm. Hg. This last mentioned product was recovered in a yield of about 52% of theory, basis $PCl_3$.

The inert organic solvent used in this example was a partially hydrogenated hydrocarbon liquid mixture having a specific gravity of about 1.004 at 25° C., a refractive index of about 1.5600 at 25° C. and a boiling range of about 340° C. to about 390° C. at atmospheric pressure. This product is produced by the method disclosed in Patent No. 2,364,719 to Jenkins.

EXAMPLE II

*Trimethyl phosphite*

The procedure employed in Example I was followed except that the tributylamine was omitted and trimethyl phosphite was recovered in a yield corresponding to only 17% of theory, basis $PCl_3$.

The foregoing examples demonstrate in a very striking manner that the use of a tertiary amine in carrying out the above reaction results in a marked increase in the yield of the phosphite ester.

In the production of trialkyl phosphites in accordance with the instant invention, the reaction is carried out at a temperature ranging from about minus 40° C. up to that temperature at which substantial decomposition of the ester is avoided. More specifically, the reaction is carried out at a temperature within the range of about minus 20° C. to about 60° C. and within these limits, a temperature of from 0° C. to 40° C. is preferred.

In carrying out this reaction, the reactants are employed in a molar ratio of alcohol to the phosphorus trihalide of about 3:1, but up to 30 molar percent or a larger excess may be employed, if desired. In general, it is desirable to use a slight excess of the alcohol in order to insure substantially complete conversion of the phosphorus trihalide to the desired ester.

The reaction is carried out in the presence of an inert solvent, preferably an inert organic solvent which boils at atmospheric pressure at a temperature substantially above that of the ester, that is, at a temperature at least 20 degrees higher than the ester at the above pressure. Illustrative examples of solvents which may be used in the practice of this invention are: phenylcyclohexane, monononyl naphthalene, mixtures of amyl naphthalenes, polyamyl naphthalene, other alkylated naphthalenes, alkylated biphenyls and partially hydrogenated terphenyls. These solvents have the following properties:

| Compound | Specific Gravity At 25° C. | Boiling Range, °C. | Solubility In Water |
|---|---|---|---|
| Phenylcyclohexane | 0.93 | 239–241/760 mm. Hg. | Insoluble. |
| Monononyl naphthalene | 0.93–0.94 | 320–350/760 mm. Hg. | Do. |
| Mixture of amylnaphthalenes | 0.92–0.94 | 290–400/760 mm. Hg. | Do. |
| Polyamyl naphthalene | 0.92–0.93 | 353–397/760 mm. Hg. | Do. |
| Propylated biphenyl | 0.94 | 163–218/20 mm. Hg. | Do. |
| Polyamyl biphenyl | 0.93–0.96 | 101–194/3–1.5 mm. Hg. | Do. |
| Ethylated biphenyl | 0.97 | 145–213/17–16 mm. Hg. | Do. |
| Monoamyl biphenyl | 0.97 | 314–333/760 mm. Hg. | Do. |
| Diamyl biphenyl | 0.96 | 364–404/760 mm. Hg. | Do. |
| Partially hydrogenated terphenyls | 1.004±0.003 | 340–396/760 mm. Hg. | Do. |

It is, of course, to be understood that other equivalent high-boiling inert solvents may be used.

As a modification of the method described herein, the reaction may be carried out in the presence of an inert low-boiling solvent, after which a high-boiling inert solvent may be added and the product fractionally distilled to separate the ester. Illustrative examples of low-boiling solvents which may be employed in the practice of this invention are: acetone, ether, butane, pentane, hexane, dioxane, benzene, toluene and xylene. Other inert solvents which boil below the boiling point of the phosphite esters at atmospheric pressure and do not solidify at the temperature of the reaction may be employed.

In the practice of the instant invention, the tertiary amines are employed in catalytic amounts, that is, in an amount varying from about 0.02 mol to about 0.5 mol for each of mol of phorphorus trihalide. Illustrative examples of tertiary amines which are suitable for use as catalysts in the production of trialkyl phosphites are triethylamine, tri-n-butylamine, trimethylamine, dimethylaniline, pyridine, 2-picoline, 3-picoline, quinoline, 2,6-lutidine, 2,4-lutidine, etc.

The recovery of the trialkyl phosphite from the crude reaction mixture is effected by distillation at a temperature at least equivalent to the boiling point of the triester at the operating pressure, but below that temperature at which substantial decomposition of this product takes place. More specifically, the distillation is carried out at a temperature in the range of about 65° C. to about 150° C.

The distillation pressure may fluctuate widely, but it is desirable to use pressures in the range of about 0.5 to about 760 mm. of Hg. More specifically, it is preferred to use a distillation pressure in the range of about 5 mm. Hg to about 20 mm. Hg.

After the separation of the trialkyl phosphite and by-product phosphorus esters from the reaction mixture, the residue comprises the organic solvent, the tertiary amine and the metal halide, from which the solvent and amine may be recovered by distillation, filtration or any other suitable method. Although the by-product esters reduce the yield of the trialkyl phosphites and to that extent are undesirable, they are products which are quite valuable and, therefore, contribute substantially to the economics of the method.

The reactions involved in the practice of the instant invention may be represented by the following equation:

$$PX_3 + 3MOR \xrightarrow[\text{Inert solvent}]{\text{Tertiary amine}} 3MX + P(OR)_3$$

wherein X is selected from the group consisting of chlorine and bromine, M is a metal selected from the group consisting of alkali metals, alkaline earth metals and earth metals and R is an alkyl group containing from 1 to 4 carbon atoms. More specifically, M may be sodium, potassium, lithium, cesium, rubidium, calcium, barium, strontium, magnesium and aluminum.

What we claim is:

1. The method of producing a trialkyl phosphite, which comprises heating in an inert solvent 1 mol of a phosphorus trihalide of the group consisting of phosphorus trichloride and phosphorus tribromide, and approximately 3 mols of an alcoholate having the structure MOR wherein M is a metal of the group consisting of the alkali metals, the alkaline earth metals, magnesium and aluminum and R is an alkyl radical having up to 4 carbon atoms, in the presence of a catalytic amount of a tertiary amine and separating the resulting trialkyl phosphite.

2. The procedure of claim 1 wherein the trialkyl phosphite is separated from the reaction mixture by distillation.

3. The procedure of claim 1 wherein the trialkyl phosphite is separated from the reaction mixture by distillation in the presence of an inert solvent having a boiling point at least 20° C. higher than the boiling point of the trialkyl phosphite.

4. The method of producing a trialkyl phosphite which comprises heating in an inert solvent 1 mol of phosphorus trichloride and approximately 3 mols of an alkali metal alcoholate wherein the organic radical is an alkyl radical having up to 4 carbon atoms, the reaction mixture containing a catalytic amount of a tertiary amine, and separating the resulting trialkyl phosphite.

5. The procedure of claim 4 wherein the trialkyl phosphite is separated from the reaction mixture by distillation.

6. The procedure of claim 4 wherein the trialkyl phosphite is separated from the reaction mixture by distillation in the presence of an inert solvent having a boiling point at least 20° C. higher than the boiling point of the trialkyl phosphite.

7. The procedure of claim 1 wherein the trialkyl phosphite is trimethyl phosphite.

References Cited in the file of this patent

UNITED STATES PATENTS

| 2,226,552 | Conary et al. | Dec. 31, 1940 |
| 2,408,744 | Engel | Oct. 8, 1946 |

FOREIGN PATENTS

| 27,527 | Great Britain | 1896 |